May 25, 1965
H. C. HARBERS
3,185,496
FIFTH WHEEL ASSEMBLY
Filed Feb. 4, 1963
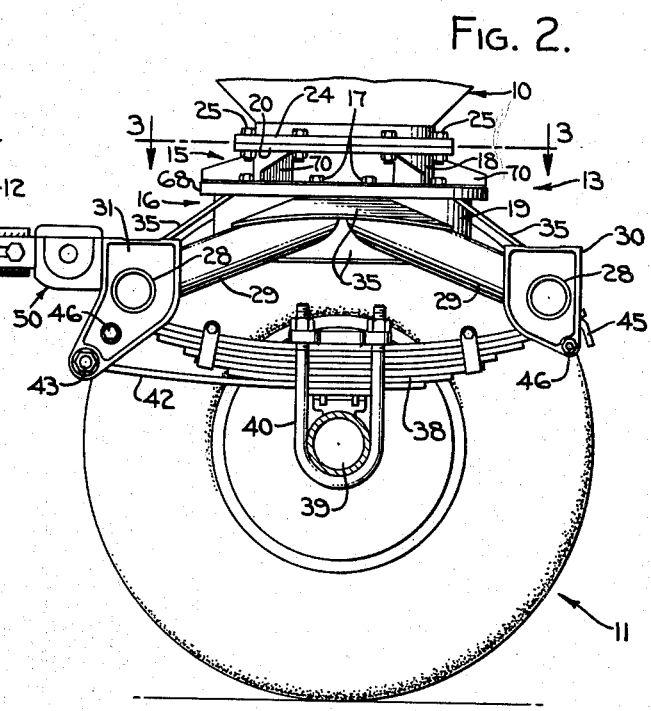
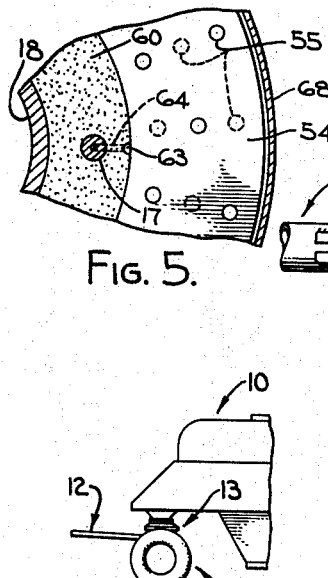
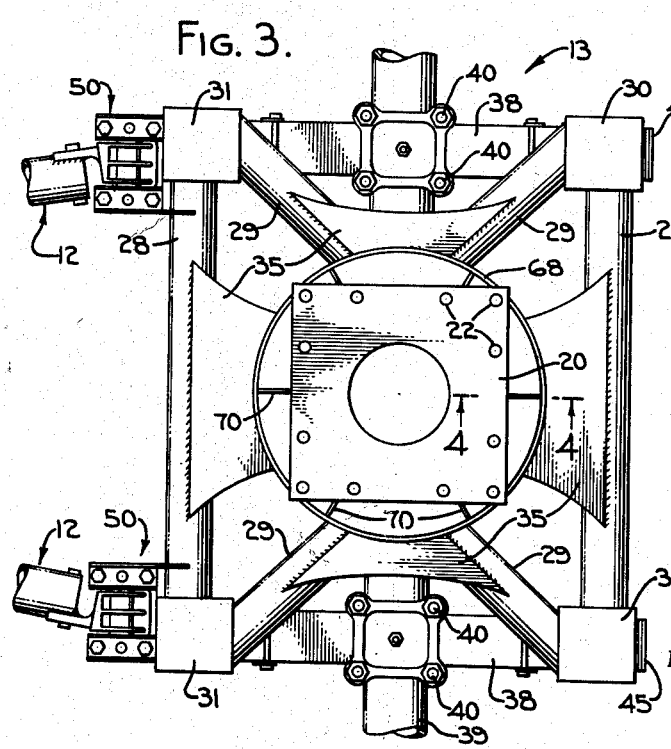
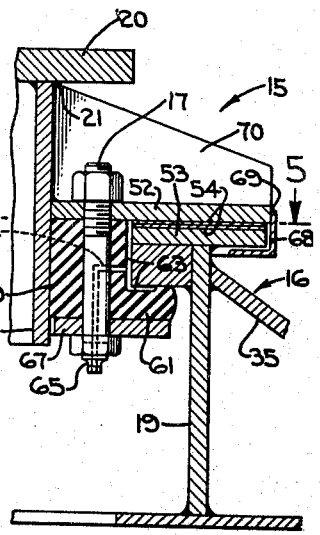
INVENTOR.
HENRY C. HARBERS.
BY
ATTORNEY.

3,185,496
FIFTH WHEEL ASSEMBLY
Henry C. Harbers, Pasadena, Calif., assignor to Western Unit Corporation, a corporation of California
Filed Feb. 4, 1963, Ser. No. 256,015
12 Claims. (Cl. 280—125)

This invention relates to fifth wheel assemblies, and more particularly to a simplified, rugged fifth wheel construction comprising two principal sub-assemblies normally in metal-to-metal contact only in the thrust-bearing thereof and featuring adjustable resilient buffer and automatic wear compensating means of a unique character interposed between adjacent portions of the two sub-assemblies.

Various proposals have been made heretofore for constructing fifth wheel assemblies capable of withstanding shock and impact loads of high magnitude normally encountered in the natural operating environments of these assemblies and which assemblies swivelly interconnect units of a tractor-trailer cargo train. The fifth wheel proper is located at the forward end of a trailer and is customarily supported on a two-wheel carriage connected by a drawbar to a forward unit of the train. It is therefore apparent that the swivelling facilities of the fifth wheel must include provision for both radial and axial thrust bearing surfaces, the thrust bearing accommodating swivelling action between the carriage and the supported load and the axial bearing accommodating the draft loads acting during movement of the cargo train. Prior proposals meeting these requirements are characterized by the massiveness of the components, their complexity, the many surfaces required by the design to be machined to close tolerance values, the need for frequent and costly maintenance servicing, and the lack of adequate provision for compensating for wear between the parts.

It is a primary object of the present invention to circumvent and substantially eliminate the foregoing and other serious disadvantages of prior fifth wheel construction. To this end the present construction comprises two principal sub-assemblies, each rigidly fabricated from a limited number of components roughly cut from inexpensive standard readily-available tubular or plate stock. No machining of any kind except possibly de-burring and rough grinding is required on any of these components which are preferably held in assembled relation with one another by welding. The thrust bearing surfaces are formed from two rings stamped from suitable sheet bearing material and placed in direct face-to-face contact between the two inter-nested sub-assemblies.

A further important feature of the invention resides in the provision of a highly resilient buffer of elastomeric material supported in a radial gap between the concentrically-related main bodies of the two sub-assemblies and so disposed as to provide a draft-absorbing tolerance-compensating axial bearing as well as means for resiliently holding the two sub-assemblies together. Associated with this buffer assembly is easily adjusted means for compressing and expanding the elastomeric buffer to compensate for wear. Associated with this means is also means for recharging and maintaining the relatively movable contacting surfaces of the assembly lubricated and replenished with lubricant as the need arises.

Another feature is the provision of a lower sub-assembly featuring a rigid main frame composed in major part of tubular members so disposed and connected as to provide maximum capability for absorbing applied loads with maximum effectiveness utilizing a minimum amount of material.

These and other more specific objects will appear upon reading the following specification and claims and upon considering in connection therewith the attached drawing to which they relate.

Referring now to the drawing in which a preferred embodiment of the invention is illustrated:

FIGURE 1 is a fragmentary side elevational view of the forward end of a typical cargo train unit incorporating the fifth wheel assembly of the present invention;

FIGURE 2 is an enlarged fragmentary side view of the fifth wheel assembly with one carriage wheel broken away;

FIGURE 3 is an enlarged top plan view of the fifth wheel assembly proper taken along line 3—3 of FIGURE 2;

FIGURE 4 is a fragmentary view on an enlarged scale taken along line 4—4 on FIGURE 3; and FIGURE 5 is a fragmentary sectional view taken along line 5—5 on FIGURE 4.

Referring initially more particularly to FIGURE 1, there is shown the forward end of a typical cargo trailer 10 mounted on a carriage-suported fifth wheel unit designated generally 11 having a drawbar 12 connecting the trailer to the rear of another trailer or to a propelling tractor, not shown. The constructional details of the fifth wheel assembly proper, designated generally 13, are best shown in FIGURES 2 to 5 to which reference will now be made.

Fifth wheel assembly 13 comprises upper and lower sub-assemblies 15 and 16 respectively, normally held permanently but swivelly inter-connected by a plurality of compensation adjusting bolts 17.

Sub-assemblies 15 and 16 comprise concentrically related thick-walled metal tubes 18, 19 (FIGURE 4) partially telescoped together. The smaller upper tube 18 has a large area connector plate 20 welded thereto as indicated at 21. This plate is provided with a plurality of holes (FIGURE 3) mating with corresponding holes of a ring 24 welded to the under forward end of trailer 10 and is held rigidly but detachably secured thereto by bolts 25.

The larger lower main body tube 19 is supported centrally at the apex of a shallow rigid frame formed by a pair of parallel tubes 28, 28 (FIGURE 3) and two pairs of upwardly and inwardly inclined tubes 29, 29. The upper ends of the latter are welded to the exterior side walls of tube 19 and their lower ends are similarly welded to side walls of steel shackle castings 30, 30 and 31, 31 in the manner suggested in FIGURES 2 and 3. Desirably, reinforcing gusset plates 35, 35 are welded between the tubular members and the exterior sidewalls of tube 19 thereby providing an extremely rigid high-strength frame construction.

Castings 30, 31 have the configuration best shown in FIGURE 2 and include provision for securing the frame of the fifth wheel unit to spring beams 38, 38 extending crosswise of carriage axle 39 and secured thereto at their mid-portions, as by U-bolt clamps 40. A feature of the spring assembly is the provision of leaf-spring radius members 42 having their rear ends firmly anchored to the carriage axle and their forward ends encircling and connected to castings 31 by shackle bolts 43. Both pairs of castings 30, 31 are floatingly supported on the opposite ends of spring beams 38 in a manner well known in the art, it being understood that each end of the beams includes a downturned keeper portion 45 positioned rearwardly of guard bolts 46 mounted crosswise of castings 30, 31 and normally out of direct contact with the spring beams. This arragnement permits the beams to flex through a wide range, keepers 45 and guard bolts 46 cooperating to safeguard against accidental disassembly of the components and in limiting the freedom of movement between these parts.

Riveted or otherwise securely attached to forward castings 31, 31 by a suitable hinge connection 50, 50 is a drawbar 12. Desirably these hinges are constructed as shown in my United States Patent 2,996,313, granted August 15, 1961.

The combined axial and thrust-bearing features forming an important part of the present invention will now be described with particular reference to FIGURES 2, 4, and 5. This bearing is formed by upper and lower continuous rings 52, 53, upper ring 52 being welded to the exterior wall of tube 18 and to reinforcing struts 70 whereas ring means 53 is welded to the upper end edge of tube 19. Interposed between the overlapping surfaces of rings 52 and 53 are a pair of identical stamped metal bearing rings 54 each formed with lubricant storing openings 55 staggered with respect to one another. The latter rings may be and preferably are bonded or otherwise suitably secured to their respective supporting rings 52, 53.

The compensating axial bearing member desirably comprises a unitary ring 60 formed of suitable elastomeric material, such as neoprene, and is L-shaped in cross section. It will be understood that this ring may be formed in more than one piece if so desired to facilitate assembly. However, advantages reside in forming it in a single piece having an inner diameter snugly embracing the exterior of main body tube 18. Horizontally extending flange or leg 61 underlies the lower surface of thrust ring 53 and has a running fit with this surface. The adjacent vertical sidewall of the buffer ring is in similar running contact with the inner edge of thrust ring 53. At circumferentially spaced points the bearing surfaces of the buffer ring are provided with shallow channels 63 communicating with lubricant supply channels 64 in the adjustable assembly bolts 17. It will be understood that these channels are charged with a suitable lubricant or grease by means of the self-sealing charging fittings 65 to lubricate the running surfaces and to replenish the lubricant needs of thrust bearing rings 54, 54. Underlying the head of adjustable bolts 17 is backup ring means 67 which is effective upon tightening the nuts of bolts 17 to place buffer ring 60 under axial compression. This compression is effective to expand ring 60 radially to adjust for wear and to maintain the running fit with ring 53 at a suitable value at all times. Play is undesirable beyond that necessary to permit free rotation of the parts. In consequence of this fact and the very extensive annular area of contact between thrust ring 53 and buffer ring 60, the described assembly transmits draft loads acting on the cargo train very efficiently and effectively. The only metal-to-metal contact normally occurring between the relatively swivelling sub-assemblies 15, 16 is that occurring between the thrust bearing plate 54, 54. The horizontal leg 61 of the buffer bearing ring precludes the entry of foreign matter and the dirt between the running surfaces of the thrust assembly and is highly effective in overcoming and preventing any except slight tilting of one sub-assembly relative to the other with respect to their aligned vertical axes.

Safeguarding against the entrance of foreign matter at the outer rim of plate 54 is suitable guard means 68 as, for example, a flanged ring secured to ring 52 by welding 69. This guard cooperates with rigid backup means 67 and with bolts 17 in holding the two sub-assemblies firmly anchored together.

In closing it is pointed out that all components of the fifth wheel assembly proper, excepting bolts 17, are preferably cast, flame-cut, sawed, or stamped from metal stock and are not subjected to machine finishing operations of any kind save possibly for deburring and grinding to remove burrs high points or surface roughness.

While the particular fifth wheel assembly herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A fifth wheel assembly for use beneath the forward end of a trailer or like vehicle and formed primarily of structural steel components welded together, said assembly having a rigid main frame including a pair of horizontally disposed parallel structural steel members adapted to extend transversely of the vehicle and to be spaced one forwardly and one rearwardly of the axis of said fifth wheel assembly, a plurality of rigid strut tubes and including means for securing the outer ends of each to the outer ends of said pair of parallel members, said strut tubes converging inwardly and upwardly toward the central area of said frame, first and second large diameter concentric rigid tubes disposed vertically between the upper ends of said upwardly converging strut tubes and each having radially disposed thrust bearing rings attached to the exterior of one and projecting inwardly from the interior of the other of said concentric tubes, the first one of said rigid tubes being welded to the upper ends of said strut tubes, and resilient buffer means sandwiched between said concentric rigid tubes in an area below and in close proximity to said thrust bearing rings and effective to restrict movement of said tubes relative to one another, and adjustable means for placing said resilient buffer means under compression to an extent found desirable to compensate for wear of the adjacent parts of said assembly.

2. A fifth wheel assembly as defined in claim 1 characterized in the provision of means for holding said concentric tubes assembled but free to rotate relative to one another and normally in metal-to-metal contact only as respects the juxtaposed surfaces of said thrust bearing rings.

3. A fifth wheel assembly as defined in claim 1 characterized in the provision of means forming part of said adjustable means for charging a supply of lubricant into the interface between said thrust bearing rings and into storage reservoirs in communication with the outer peripheral rim of said resilient buffer means.

4. A fifth wheel assembly formed from substantially non-machined metal components roughly cut to desired sizes and shapes and welded together into upper and lower principal sub-assemblies, said sub-assemblies including partially-nested concentrically-related main body tubes each provided with a rigidly attached wide and relatively thin load-bearing thrust ring means formed from plate steel having their wide radially disposed surfaces in direct supporting contact with one another, an annular radial gap between the peripheral rim edge of one of said thrust rings and the juxtaposed side wall surface of the other of said main body tubes, resilient non-metallic buffer means substantially filling said annular gap and providing a resilient radial buffer between said sub-assemblies and effective to compensate for the lack of machine-finished surfaces on components of said sub-assemblies juxtaposed to surfaces of said buffer means, and means for placing said buffer means under compression axially of said upper and lower subassemblies to expand said buffer means radially to compensate for wear occurring during the service of said fifth wheel assembly.

5. A fifth wheel assembly as defined in claim 4 characterized in that said buffer means includes a radially projecting flange effective as said buffer means is placed under compression to hold said thrust rings pressed more firmly together and additionally effective to hold said sub-assemblies in assembled relationship and strongly resisting forces tending to cant said sub-assemblies axially relative to one another.

6. A fifth wheel assembly as defined in claim 4 characterized in that said upper sub-assembly includes means for rigidly securing the same to the lower forward portion of wheeled trailer means and in that said lower sub-assembly includes a rigid frame adapted to be attached to spring beam means mounted on carriage means.

7. A fifth wheel assembly having a rigid lower frame equipped centrally thereof with a vertically disposed large diameter first metal tube, a rigid upper frame having a downwardly directed second metal tube of substantially smaller diameter projecting co-axially into the upper end of said first tube, a pair of horizontally disposed ring means one of which is seated on and fixed to the upper end edge of said first tube and the other of which projects horizontally from the exterior of said second tube to closely overlie said one ring means, thrust bearing rings disposed between the facing surfaces of said pair of rings and providing relatively rotatable thrust bearing surfaces, elastomeric ring means at least portions of which are L-shaped in cross-section and the main body of which embraces the lower end of said second tube with the horizontally-disposed portions thereof underlying the underside of the lower one of said pair of rings, the exterior rim of said elastomeric ring being in close wiping relation with the inner peripheral edge of said lower thrust ring, and means holding said elastomeric ring means firmly anchored to the upper one of said pair of rings.

8. A fifth wheel assembly as defined in claim 7 characterized in that said means anchoring said elastomeric ring in assembled position includes rigid metal back-up means underlying the bottom thereof, adjustable clamping bolts for compressing said elastomeric ring means vertically to expand the same outwardly to compensate for wear, and means for charging lubricant between the relatively rotatable components of said assembly in close wiping relation to one another.

9. A fifth wheel assembly as defined in claim 8 characterized in the provision of guard means secured to the outer rim edge of the one of said thrust rings and embracing the adjacent outer rim edge of the underlying thrust ring.

10. A fifth wheel assembly as defined in claim 9 characterized in that said guard means projects radially inwardly beneath said lower thrust ring but is normally out of contact therewith.

11. A combined draft and thrust bearing assembly for use in a cargo train fifth wheel unit, said bearing assembly comprising a pair of concentrically-related vertically-disposed tubes held in axially-spaced relation by a pair of thrust bearing ring means in wiping rotary contact with one another on a plane normal to the axes of said tubes, and draft-absorbing axial bearing means comprising elastomeric material arranged in a ring and disposed between said tubes with one peripheral wall thereof directly supported by one of said tubes and with the other peripheral wall thereof having a close running fit with the adjacent peripheral edge of the thrust bearing ring means secured to the other of said tubes, and adjustable means for compressing said elastomeric material axially thereof to expand the same radially as desirable to provide a proper running fit with the adjacent peripheral edge of said thrust bearing ring means.

12. The assembly defined in claim 11 characterized in the provision of lubricant storing channels in said elastomeric means and in communication with the rim edge of said thrust bearing ring means to supply lubricant thereto.

References Cited by the Examiner
UNITED STATES PATENTS

| | | | |
|---|---|---|---|
| 1,920,390 | 8/33 | Helms | 280—125 |
| 2,653,828 | 9/53 | Alley | 280—130 X |
| 2,960,350 | 11/60 | Broughton | 280—136 |

FOREIGN PATENTS

| | | |
|---|---|---|
| 575,171 | 2/46 | Great Britain. |

A. HARRY LEVY, *Primary Examiner.*

LEO FRIAGLIA, *Examiner.*